United States Patent [19]
Toffolo et al.

[11] Patent Number: 5,982,368
[45] Date of Patent: Nov. 9, 1999

[54] VEHICLE DISPLAY USING ICONS

[75] Inventors: Daniel Toffolo, Wilton, Conn.; Silviu Palalau, Birmington, Mich.; Marian Borzea, Farmington Hills, Mich.; William Rogers, Soffield; Luiz F.H. Bacellar, South Glastonbury, both of Conn.

[73] Assignee: Lear Automotive Dearborn, Inc., Southfield, Mich.

[21] Appl. No.: 08/961,361

[22] Filed: Oct. 30, 1997

Related U.S. Application Data

[63] Continuation of application No. 08/920,029, Aug. 26, 1997.

[51] Int. Cl.⁶ .................................. G06F 3/00; G06F 3/14
[52] U.S. Cl. .......................... 345/348; 345/970; 345/522; 345/503; 701/28
[58] Field of Search ................................ 345/339, 348, 345/502, 503, 504, 522, 970; 701/28, 211; 340/990, 995

[56] References Cited

U.S. PATENT DOCUMENTS

| | | | |
|---|---|---|---|
| 5,031,104 | 7/1991 | Ikeda et al. | 701/209 |
| 5,097,411 | 3/1992 | Doyle et al. | 345/522 |
| 5,396,431 | 3/1995 | Shimizu et al. | 701/213 |
| 5,504,917 | 4/1996 | Austin | 345/522 |
| 5,555,502 | 9/1996 | Opel | 701/36 |
| 5,617,319 | 4/1997 | Arakawa et al. | 701/207 |
| 5,648,755 | 7/1997 | Yagihashi | 340/439 |
| 5,699,056 | 12/1997 | Yoshida | 340/905 |
| 5,721,684 | 2/1998 | Takita | 364/443 |
| 5,739,772 | 4/1998 | Nanba et al. | 340/990 |
| 5,787,383 | 7/1998 | Moroto et al. | 701/210 |
| 5,793,631 | 8/1998 | Ito et al. | 701/200 |
| 5,802,492 | 9/1998 | DeLorme et al. | 701/200 |
| 5,838,334 | 11/1998 | Dye | 345/503 |

FOREIGN PATENT DOCUMENTS

| | | | |
|---|---|---|---|
| 0675341A1 | 10/1995 | European Pat. Off. | G01C 21/20 |
| 4033832A1 | 6/1991 | Germany | G06F 3/037 |
| WO9713657 | 4/1997 | WIPO | B60R 16/02 |

OTHER PUBLICATIONS

International Search Report for PCT Application No. PCT/US98/16670 with a filing date of Aug. 12, 1998.

Measurement & Control, vol. 25, Nov. 1992; "Advanced Integrated Driver Information Systems"., London, Great Britain.

*Primary Examiner*—Raymond J. Bayerl
*Assistant Examiner*—X. L. Bautista
*Attorney, Agent, or Firm*—Niro, Scavone, Haller & Niro

[57] ABSTRACT

A display system includes an input device sending information on a vehicle bus to a display controller. Based upon the information from the input device, the display controller selects one of a plurality of graphics stored on a local memory. The selected graphic is displayed on a display by the display controller.

22 Claims, 2 Drawing Sheets

VEHICLE DISPLAY USING ICONS

This application is a continuation-in-part of U.S. Ser. No. 08/920,029 filed on Aug. 26, 1997 Pending.

BACKGROUND OF THE INVENTION

The present invention relates generally to displays, and more particularly to a vehicle display having a plurality of display areas, each selectively displaying one of a plurality of locally-stored graphics based upon information received on a vehicle bus.

Vehicle manufacturers are increasingly using high-resolution, reconfigurable displays in vehicles to present vehicle information, such as turn-by-turn navigation information from a navigation system. High-resolution reconfigurable displays are aesthetically desirable and convey a high-tech image to the consumer. However, it is not currently possible to send high-resolution graphics from an electronic vehicle device to a display via the standard vehicle bus (e.g. J1850 can, etc.). Current vehicle buses are unable to handle the bandwidth which would be required to transmit high resolution images from the navigation system to the display. Moreover, high data transmission rates across the vehicle bus for graphical displays would substantially interfere with communication between other vehicle components on the vehicle bus.

SUMMARY OF THE INVENTION

The present invention provides a high-resolution display system, particularly for use in a vehicle, comprising an input device sending information to a display unit on a vehicle bus, such as the J1850. The display includes a local memory containing a plurality of "icons" which are selected based upon information received via the vehicle bus. Since the icons are not transmitted via the vehicle bus, but rather a local bus between the local memory and the display, the icons preferably comprise high-resolution graphics. One of the plurality of icons is selected based upon the information from the input device. The selected icon is then transmitted from the local memory over the local bus to the display. As a result, the high-resolution data need not be transmitted over the vehicle bus.

In one embodiment, the vehicle input device is a navigation system. Preferably the display includes a first display area selectively displaying one of a plurality of first icons and a second display area selectively displaying one of a plurality of second icons. The first icons present different types of intersections, such as four way intersections, "T" intersections, "Y" intersections, freeway entrances/exits, etc. Based upon the information from the navigation system, the display selects a first icon representing the type of intersection for the next turn and displays it in the first display area. Simultaneously, based upon information from the navigation system regarding the geographical heading of the vehicle, the display selects one of the second icons indicating the current vehicle heading and displays it in the second display area.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
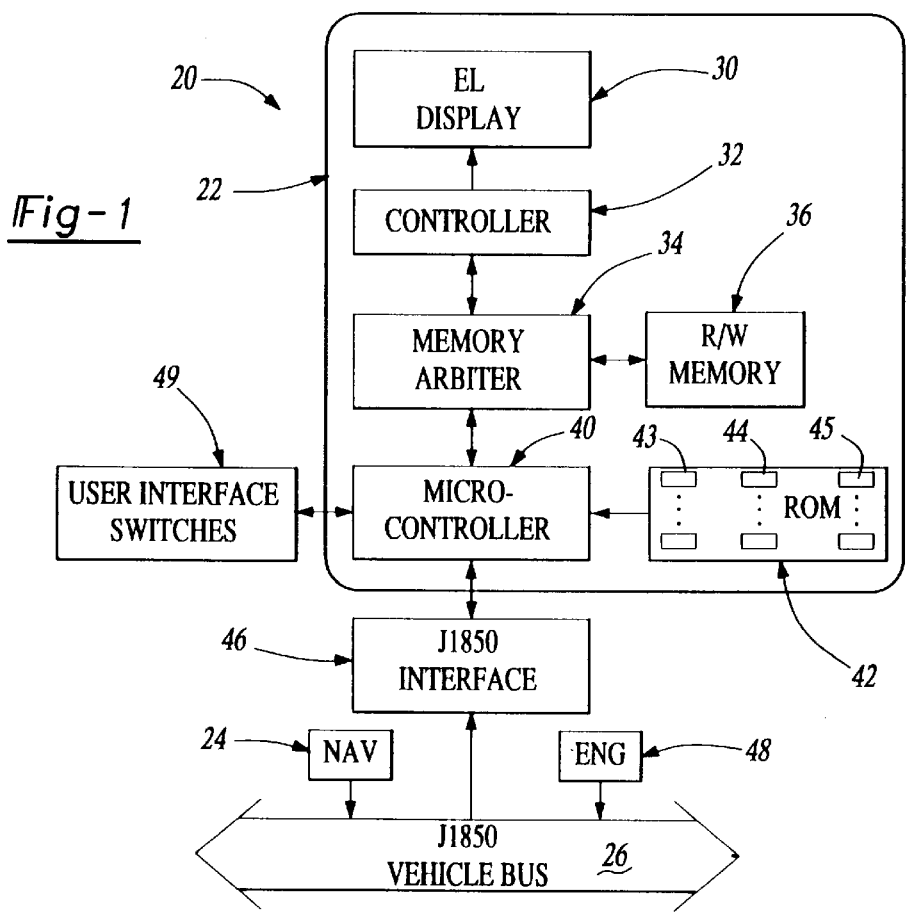
FIG. 1 is a schematic of the display system of the present invention.

FIG. 1 illustrates a schematic of a vehicle display system 20 according to the present invention. The vehicle display system 20 generally comprises a display unit 22 receiving information from an input device 24, such as a navigation system 24, via a vehicle bus. As is known, the vehicle bus, preferably the J1850 standard vehicle bus or an I-bus, carries information among numerous electrical components, sensors and controls in the vehicle. Although the display system 20 of the present invention could be utilized in applications outside of a vehicle, it is the use of the standard vehicle bus 26 to communicate information between the navigation system 24 and the display unit 22 which best illustrates the advantages of the present invention. However, it should be recognized that the display system 20 of the present invention could also be utilized in other applications.

The display unit 22 includes a display 30, such as an electroluminescent display, or any other high-resolution reconfigurable, preferably color, display. The display 30 is operated by a controller 32, which may include the column and row drivers for the electroluminescent display 30. As is known, the display 30 comprises a matrix of pixels, each individually addressable by activation of row and column drivers in the controller 32. Each pixel in the display 30 is activated according to information received from the memory arbiter 34. The memory arbiter 34 addresses pixel-by-pixel information stored in frame memory 36 and sends it to the controller 32 for display on display 30. The memory arbiter 34 also periodically stores graphical information received from microcontroller 40 in frame memory 36. The microcontroller 40 selectively addresses read-only memory 42, preferably flash memory 42, in order to access a plurality of first icons 43, a plurality of second icons 44, and a plurality of third icons 45, all of which will be described in more detail below. The microcontroller 40 receives information from the vehicle bus 26 via the bus interface 46. The bus interface 46 may be incorporated into the microcontroller 40. As is known, other vehicle components, such as the engine controller 48 send and receive information via the vehicle bus 26.

In operation, the navigation system 24 sends information via vehicle bus 26 and bus interface 46 to the microcontroller 40. The microcontroller 40 addresses a selected one of the plurality of first icons 43, a selected one of the plurality of second icons 44, and a selected one of the plurality of third icons 45. The selected first, second and third icons are then sent by the microcontroller 40 to the memory arbiter 34 and stored in frame memory 36 and displayed on display 30 as will be described below. Some of the information received by the microcontroller 40 from the navigation system 24 via the vehicle bus 26 is converted to text format and sent to the memory arbiter 34 by the microcontroller 40, for display on display 30.

The microcontroller 40 preferably receives input from a plurality of user switches 49, such as a graphical user interface, for indicating preferences such as brightness, color etc. The icons 43-45 generally comprise graphical information for display on display 30, such as pixel-by-pixel display information, or bit-mapped format. Other formats could also be utilized.

Figure 2:
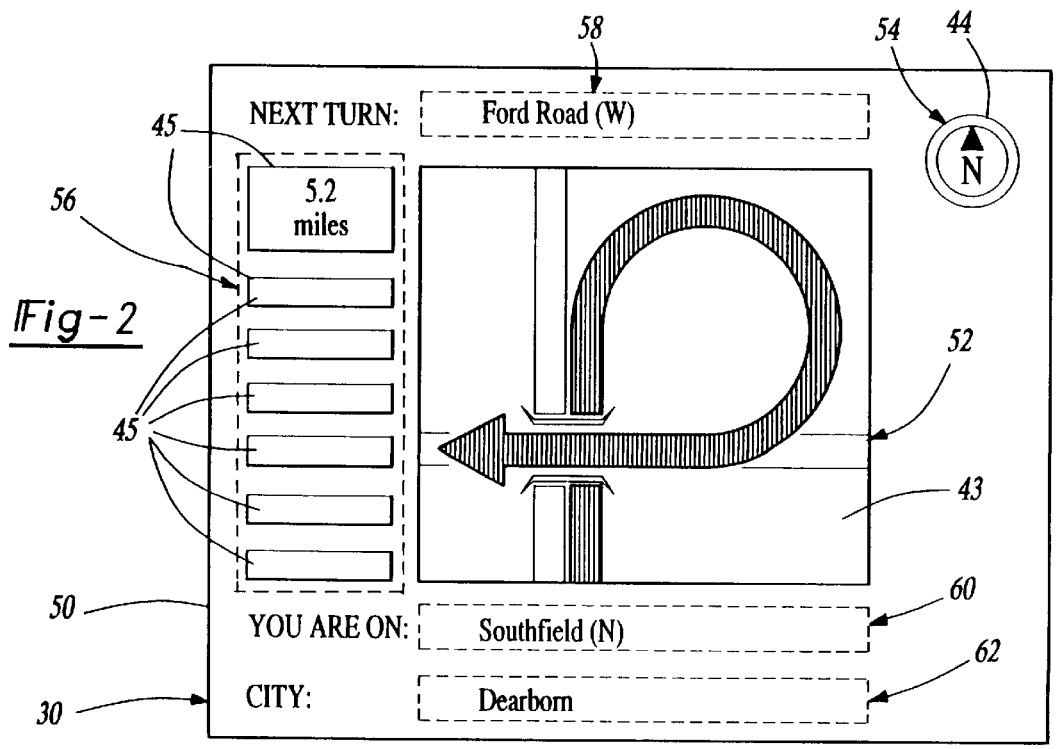
FIG. 2 is a sample image from the display of FIG. 1.

A sample image 50 displayed by display 30 is shown in FIG. 2. The display preferably includes a first display area 52 in which is selectively displayed a selected one of the plurality of first icons 43. There are preferably at least twenty available first icons 43 illustrating different types of intersections such as four way intersections, "T" intersections, "Y" intersections, freeway entrances/exits, etc. The selected first icon 43 indicates the type of intersection identified with the next turn in the route guidance instructions from the navigation system 24. The first icon 43 is selected based upon the information from the navigation system 24.

The display 30 further includes a second display area 54 in which is selectively displayed one of the second icons 44 indicating geographical heading of the vehicle. There are preferably a total of eight second icons 44, i.e. north, northeast, east, southeast, south, southwest, west, northwest. The second icon 44 is selected based upon information from the navigation system 24.

The display 30 further includes a third display area 56 which is preferably a proximity indicator indicating the distance to the next turn in the route guidance instructions from the navigation system 24. The proximity indicator 56 preferably comprises a plurality of third icons 45 which are sequentially deleted as the vehicle nears the next turn required by the navigation system 24. The third icon 45 is selected based upon information from the navigation system 24. The proximity indicator is described in further detail in co-pending application U.S. Ser. No. 08/960,786 filed on Oct. 30, 1997 entitled "Proximity Indicator Display."

The display 30 preferably further includes a plurality of text display areas, including a next turn field 58, indicating the name of the road and geographical heading for the next turn, according to the navigation system 24. This information is received from the navigation system 24 and displayed in display 30 as text information.

The display 30 further includes a current road field 60 indicating the name of the road on which the vehicle is currently located and geographical heading, as determined by the navigation system 24, communicated through vehicle bus 26 and indicated to the display 30 as text. The display 30 includes a similar current city field 62, which is again a text field indicating the name of the city in which the vehicle is currently located, as determined by the navigation system 24. The city field 62 information is preferably transmitted by the navigation system 24 via the vehicle bus 26 and displayed by display 30.

In operation, referring to FIGS. 1 and 2, the navigation system 24 generates current vehicle heading, next turn road name and heading, current road name and heading, current city name, next intersection type and proximity to next turn information. This information is transmitted via the vehicle bus 26 to the display unit 22. The information is received by the J1850 interface 46 and received by the microcontroller 40. The microcontroller 40 utilizes the next intersection type information to index the first plurality of icons 43 and select one of the available intersection type icons 43. The microcontroller 40 also indexes the flash memory 42 to select one of the plurality of second icons 44, utilizing the current vehicle heading information, to select the icon 44 indicating the current vehicle heading. The microcontroller 40 indexes the flash memory 42 utilizing the proximity information to selectively address one or more of the plurality of third icons 45, graphically indicating the proximity of the next turn. The selected first, second and third icons 43-45 are transmitted by the microcontroller 40 to the memory arbiter 34 and stored in frame memory 36. The frame memory 36 is mapped to the display 30; therefore the selected first icon 43 is stored in a portion of the frame memory 36 corresponding to the first display area 52 of the display 30. Similarly, the selected second icon 44 is selectively stored in that portion of the frame memory 36 corresponding to the second display area 54 of the display 30. The selected third icon 45 is selectively stored in the frame memory 36 in the location corresponding to the third display area 56 of the display 30. The text information, specifically, the next turn field 58, current road field 60 and current city field 62 is converted to bitmapped text by the microcontroller 40 and passed from the microcontroller 40 to the memory arbiter 34 and stored in the appropriate locations 36 in the frame memory 36. The memory arbiter 34 sends pixel-by-pixel information to the controller 32 which controls the display 30 to display information stored in frame memory 36.

The display system 20 of the present invention can provide a high resolution, reconfigurable display 30, displaying high resolution, reconfigurable information based upon information from the navigation system 24. The high resolution information does not pass from the navigation system 24 to the display unit 22 via the vehicle bus 26. Rather, only sufficient identifying information sufficient to index each of the plurality of icons 43-45 need be transmitted to the display unit 22 via the vehicle bus 26. Since the local frame memory 36 is connected to the memory arbiter 34 and controller 32 of the display 30 via a local bus which is not shared with numerous other vehicle components high resolution information can be quickly sent from frame memory 36 to the display 30.

Although the display system 20 of the present invention has been described with respect to vehicles, it should be recognized that the display system 20 of the present invention would have other applications as well. However, the vehicle bus 26 best illustrates the problem overcome by the present invention.

Figure 3:
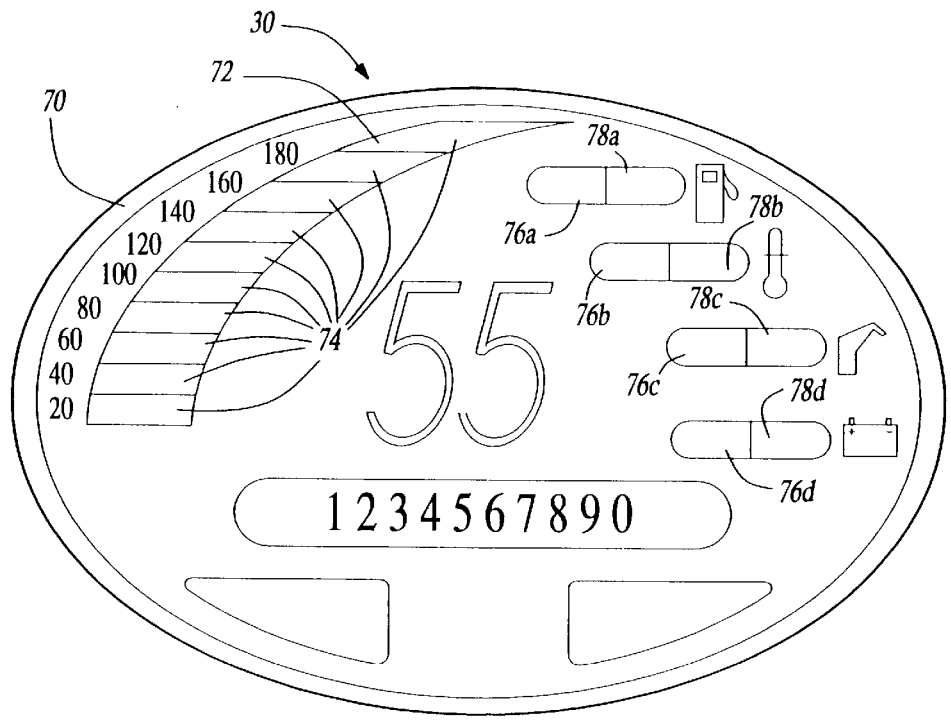
FIG. 3 is another sample image of the display of FIG. 1.

An alternate image 70 as shown in FIG. 3 can be displayed by display 30 in place of, or alongside the image 50 of FIG. 2. The image 70 includes a first display area 72 graphically indicating the speed of the vehicle by selectively displaying one of a plurality of speed icons 74. Image 70 further includes a plurality of gauge display areas 76a–d each displaying one of a plurality of available gauge icons 78a–d. The icons 74, 78 are selected as described above based upon information received from the engine controller 48 and displayed in the first display area 72 and gauge display areas 76a–d. Bitmaps of the icons 74, 78 are stored in flash memory 42 (FIG. 1).

Figure 4:
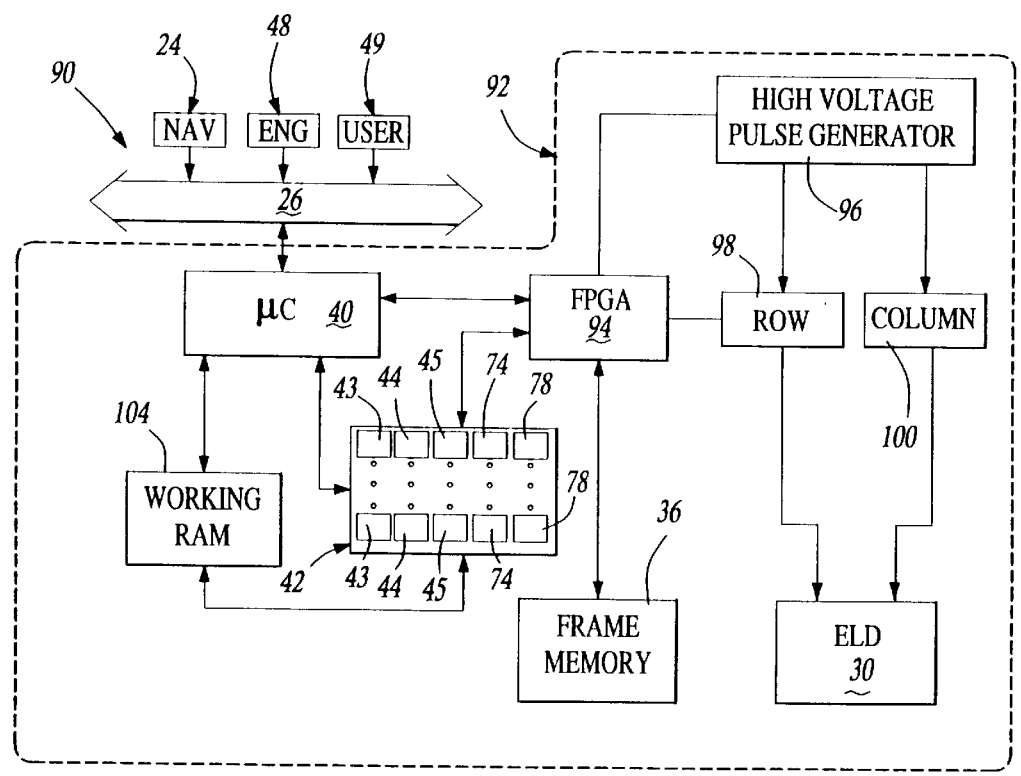
FIG. 4 is a schematic which could be used as an alternative to that shown in FIG. 1.

FIG. 4 illustrates a schematic of an alternative display system 90 according to the present invention which could be utilized in place of the schematic of FIG. 1. The display system 90, similar to that shown in FIG. 1, includes a display unit 92 receiving information via a vehicle bus 26 from a navigation system 24 and an engine controller 48. The user interface switches 49 also send information via the bus 26. The vehicle bus 26 could comprise a J-1850 bus, an I-bus or equivalents. The display unit 92 also includes the display 30 which is preferably an ELD 30. The display unit 92 includes the microcontroller 40, which is preferably a C-165. The microcontroller 40 preferably includes the bus interface 46 (not shown). The microcontroller 40 selectively accesses a flash memory 42 which includes the icons 43, 44, 45, 74, 78 such as described above with respect to FIGS. 1–3.

The display unit 92 further includes the frame memory 36 which is mapped pixel-by-pixel to the ELD 30.

The display unit 92 includes a FPGA 94 which has direct memory access to the flash memory 42 where icons 43, 44, 45, 74, 78 are stored. The ELD 30 is activated by a high voltage pulse generator 96, a row driver 98 and a column driver 100, as are well known for ELD's. The microcontroller 40 preferably includes additional working RAM 104.

In contrast to the embodiment shown in FIG. 1, in the display unit 92, the FPGA 94 has sole direct access to the frame memory 36. In addition, it also has direct memory access to the flash memory 42, which was previously accessible only to the microcontroller 40. The microcontroller 40 is normally in control of the address and data bus to the flash memory 42, and the microcontroller grants access to the FPGA 94 after the FPGA 94 initiates a bus request, in the manner well known in the art. The FPGA 94 preferably generates additional text and graphics which may be overlayed or supplemented to the icons 43, 44, 45, 774, 78. The FPGA 94 preferably includes graphics and text generation algorithms. Thus, information such as text received via the bus 26 are generated into graphical text representations by the FPGA 94 and stored in the frame memory 36 along with the icons 43, 44, 45, 74, 78 to be displayed on the ELD 30. The FPGA 94 generates text, such as the fields 58, 60, 62 of FIG. 2. Because the FPGA 94 directly accesses the flash memory 42, the display unit 92 has increased efficiency. Therefore, higher resolution icons 43, 44, 45 can be utilized, or alternatively, lower cost microcontroller 40 and FPGA 94 can be utilized. Additionally, since the FPGA 94 reduces the computational load on the microcontroller 40, the microcontroller 40 can also be of lower cost. In operation, the microcontroller 40 receives information via the vehicle bus 26 from the navigation system 24, the engine controller 48 and the user input switches 49. The operation of the display system 90 will be described with respect to information received from the navigation system 24, for illustrative purposes. Based upon the information received from the navigation system 24, microcontroller 40 indicates to the FPGA 94 a selected one of the plurality of first icons 43, a selected one of the plurality of second icons 44, and a selected one of the plurality of third icons 45, a selected one of the plurality of speed icons 74, and a selected one of the plurality of gage icons 78. An index or address of each of the selected first, second, third speed and gage icons are sent by the microcontroller 40 to the FPGA 94. In addition, some of the information received by the microcontroller 40 from the navigation system 24 via the vehicle bus 26, such as street names for fields 58, 62 and city names for field 60 (FIG. 2) are sent in text format, such as ASCII, to the FPGA 94. The FPGA 94 then addresses the flash memory 42 to directly access the selected first, second, third speed and gage icons 43, 44, 45, 74, 78 and store them in appropriate locations in the frame memory 36.

It should be apparent that the FPGA 94 may alternatively be an ASIC, CPLD, PAL, GAL, ASSP, LSI, MSI, PLA, etc. The FPGA 94 may alternatively include a microprocessor or other controller or combination logic. Further, the microcontroller 40 and FPGA 94 may be integrated onto a single chip or into a multichip module.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A display system comprising:
a vehicle bus communication link;
an input device providing information on said bus that is indicative of a desired display;
a display;
a local memory that is separate from said bus and contains a plurality of icons;
a display controller in communication with said bus and receiving said information from said bus, said display controller selecting at least one of said plurality of icons from said local memory based upon said information and sending said selected icon to said display.

2. The display system of claim 1 wherein said plurality of icons stored on said local memory comprises a plurality of first icons and a plurality of second icons, said display controller selecting from among said plurality of first icons and from among said plurality of second icons based upon said information, said display simultaneously displaying said selected first icon and said selected second icon.

3. The display system of claim 1 wherein each said icon comprises a bitmapped graphic.

4. The display system of claim 1 wherein said display controller comprises a first controller receiving said information from said bus and a second controller selecting one of said plurality of icons.

5. The display system of claim 4 wherein said second controller has direct memory access to said local memory.

6. The display system of claim 4 further including a frame memory accessible by said second controller, said frame memory storing said selected icon to be displayed on said display.

7. The display system of claim 6 wherein said frame memory is mapped to said display, said display displaying according to said frame memory.

8. The display system of claim 4 wherein said first controller sends text information to said second controller, said second controller converting said text information to a displayable format.

9. The display system of claim 4 wherein said second controller generates graphics utilizing graphic-generation algorithms.

10. The display system of claim 4 wherein said plurality of icons stored on said local memory comprises a plurality of first icons and a plurality of second icons, said second controller selecting from among said plurality of first icons and from among said plurality of second icons based upon said information, said display simultaneously displaying said selected first icon and said selected second icon.

11. The display system of claim 10 further including a frame memory accessible by said second controller, said second controller storing said selected first icon and said selected second icon in said frame memory, said frame memory mapped to said display, said display displaying the contents of said frame memory.

12. A vehicle input device and display unit comprising:
a vehicle bus;
an input device sending information that is indicative of a desired display on said vehicle bus;
a display unit comprising a local memory that is separate from said bus, a display controller and a display, said display unit receiving said information from said vehicle bus;
said local memory storing a plurality of first icons and a plurality of second icons;
said display controller selecting at least one of said plurality of said first icons and at least one of said plurality of second icons from said local memory based upon said information from said vehicle bus, said display controller sending said selected first and second icons to said display;

said display including a first display area and a second display area, said display displaying said selected first icon in said first display area and said selected second icon in said second display area.

13. The vehicle input device and display unit of claim 12 wherein said first and second icons comprise pixel-by-pixel information based upon which said display displays said first and second icons.

14. The vehicle input device and display unit of claim 12 wherein said input device includes a navigation system, each of said first icons graphically indicating a type of intersection, said information from said navigation system selecting one of said types of intersections to be displayed.

15. The vehicle input device and display unit of claim 12 wherein said input device includes a navigation system, said information indicating a geographical direction.

16. The display system of claim 12 wherein said display controller comprises a first controller receiving said information from said bus and a second controller selecting one of said plurality of first icons and one of said plurality of second icons.

17. The display system of claim 16 wherein said second controller has direct memory access to said local memory.

18. The display system of claim 16 further including a frame memory accessible by said second controller, said frame memory storing said selected first and second icons to be displayed on said display.

19. The display system of claim 16 wherein said frame memory is mapped to said display, said display displaying according to said frame memory.

20. The display system of claim 12 wherein said first controller sends text based upon said information to said second controller, said second controller converting said text to a displayable format.

21. A method for displaying information comprising:

storing a plurality of graphics in a local memory;

sending information regarding a desired display via a vehicle bus communication link;

selecting one of said plurality of graphics based upon said information from said bus; sending said selected one of said plurality of graphics via a local communication link that is separate from said local memory to a display;

displaying said selected one of said plurality of graphics.

22. The method of claim 21 further including the steps of:

storing a plurality of first icons and a plurality of second icons;

selecting one of said plurality of first icons and one of said plurality of second icons from said local memory based upon said information from said vehicle bus;

sending said selected first and second icons to said display; displaying said selected first icon in a first display area of said display and said selected second icon in a second display area of said display.

* * * * *